(12) United States Patent
Hwang et al.

(10) Patent No.: US 12,039,010 B2
(45) Date of Patent: Jul. 16, 2024

(54) METHOD AND APPARATUS FOR UNSUPERVISED DOMAIN ADAPTATION

(71) Applicant: AJOU UNIVERSITY INDUSTRY-ACADEMIC COOPERATION FOUNDATION, Suwon-si (KR)

(72) Inventors: Won Jun Hwang, Seoul (KR); Jae Min Na, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 274 days.

(21) Appl. No.: 17/563,663

(22) Filed: Dec. 28, 2021

(65) Prior Publication Data

US 2022/0383047 A1 Dec. 1, 2022

(30) Foreign Application Priority Data

Jun. 1, 2021 (KR) .................. 10-2021-0071062

(51) Int. Cl.
*G06K 9/62* (2022.01)
*G06F 18/214* (2023.01)

(52) U.S. Cl.
CPC .............................. *G06F 18/2148* (2023.01)

(58) Field of Classification Search
CPC .................................................. G06F 18/2148
See application file for complete search history.

(56) References Cited

PUBLICATIONS

Cui, S., Wang, S., Zhuo, J., Su, C., Huang, Q., & Tian, Q. (2020). Gradually vanishing bridge for adversarial domain adaptation. In Proceedings of the IEEE/CVF conference on computer vision and pattern recognition, pp. 12455-12464 (10 Pages) (Year: 2020).*
Jaemin Na, et al. "FixBi: Bridging Domain Spaces for Unsupervised Domain Adaptation", 2021, pp. 1094-1103.
Daumé III et al., "Frustratingly Easy Semi-Supervised Domain Adaptation", Proceedings of the 2010 Workshop on Domain Adaptation for Natural Language Processing, ACL 2010, Uppsala, Sweden, Jul. 15, 2010, pp. 53-59 (7 pages total).
Li et al., "Transferable Semantic Augmentation for Domain Adaptation", arXiv:2103. 12562v1, Mar. 23, 2021, pp. 1-13 (13 pages total).
Request for the Submission of an Opinion dated Oct. 26, 2022 from the Korean Intellectual Property Office in KR Application No. 10-2021-0071062.

* cited by examiner

*Primary Examiner* — David F Dunphy
(74) *Attorney, Agent, or Firm* — Sughrue Mion, PLLC

(57) ABSTRACT

The present invention relates to a method and apparatus for unsupervised domain adaptation, including the steps of generating a first augmented domain associated with a source domain, generating a second augmented domain associated with a target domain, and performing unsupervised domain adaptation by using the first augmented domain and the second augmented domain as a bridge for connecting the source domain and the target domain, and it is possible to apply to other exemplary embodiments.

16 Claims, 3 Drawing Sheets

METHOD AND APPARATUS FOR UNSUPERVISED DOMAIN ADAPTATION

CROSS-REFERENCE TO RELATED APPLICATION

This application claims priority to and the benefit of Korean Patent Application No. 10-2021-0071062, filed on Jun. 1, 2021, the disclosure of which is incorporated herein by reference in its entirety.

TECHNICAL FIELD

The present invention relates to a method and apparatus for unsupervised domain adaptation.

BACKGROUND ART

Deep learning is a technical methodology used to cluster or classify data such as images, and it requires a large amount of data to derive accurate results, and the existence of a source dataset for supervised learning is essential. The source dataset is a set of data to which a class is assigned, and it may be composed of a pair of an input and a label, respectively. However, in the case of such a source dataset, the user has to assign a class to each image directly, which requires a lot of labor force.

The unsupervised domain adaptation technique is a methodology that can solve this problem, and it learns a target dataset to which a class is not assigned based on a source dataset to which a class is assigned. However, the conventional unsupervised domain adaptation scheme is based on direct adaptation from a source domain including a source dataset to a target domain including a target dataset, and thus, a large domain mismatch occurs.

DISCLOSURE

Technical Problem

The exemplary embodiments of the present invention for solving these conventional problems are directed to providing a method and apparatus for unsupervised domain adaptation that perform domain adaptation by generating an augmented domain for connecting a source domain and a target domain by using a mixup method having a fixed ratio.

In addition, the exemplary embodiments of the present invention are directed to providing a method and apparatus for unsupervised domain adaptation that generate an augmented domain based on a source domain, and generate an augmented domain based on a target domain to gradually transfer learning results from the source domain to the target domain through bidirectional matching between the augmented domains.

Technical Solution

The method for unsupervised domain adaptation according to an exemplary embodiment of the present invention includes the steps of generating a first augmented domain associated with a source domain, generating a second augmented domain associated with a target domain, and performing unsupervised domain adaptation by using the first augmented domain and the second augmented domain as a bridge for connecting the source domain and the target domain.

In addition, the step of generating the first augmented domain is setting a first ratio that is a fixed mixup ratio for the source domain and generating a mixup sample for the source domain by using the first ratio.

In addition, the step of generating the second augmented domain is setting a second ratio that is a fixed mixup ratio for the target domain and generating a mixup sample for the target domain by using the second ratio.

In addition, the step of performing the unsupervised domain adaptation includes updating a fixed ratio-based mixup and self-penalization for the source domain and the target domain based on the generated mixup sample.

In addition, after updating the fixed ratio-based mixup and self-penalization, the method further includes updating a bidirectional matching value based on a source domain weight, if the target domain weight is more than a threshold associated with the target domain.

In addition, the method further includes confirming whether the source domain weight is more than a threshold associated with the source domain, if the target domain weight is less than or equal to a threshold associated with the target domain, and updating the bidirectional matching value based on the target domain weight, if the source domain weight is more than a threshold associated with the source domain.

In addition, after updating the bidirectional matching value, the method further includes obtaining a consistency regularization loss for the mixup sample, and updating a consistency regularization loss for each of the source domain and the target domain by using the consistency regularization loss for the mixup sample.

In addition, after performing the unsupervised domain adaptation, the method further includes confirming the source domain weight and target domain weight values based on learning results through the unsupervised domain adaptation.

In addition, the sum of the first ratio and the second ratio is 1.

Moreover, the apparatus for unsupervised domain adaptation according to an exemplary embodiment of the present invention includes a memory for storing a plurality of image data, and a controller for performing unsupervised domain adaptation by generating a first augmented domain associated with a source domain including source data that is a plurality of image data among the image data and a second augmented domain associated with a target domain including target data that is a plurality of image data among the image data, and using the first augmented domain and the second augmented domain as a bridge for connecting the source domain and the target domain.

In addition, the first augmented domain is a mixup sample for the source domain generated by setting a first ratio that is a fixed mixup ratio for the source domain and using the first ratio.

In addition, the second augmented domain is a mixup sample for the target domain generated by setting a second ratio that is a fixed mixup ratio for the target domain and using the second ratio.

In addition, the controller updates a fixed ratio-based mixup and self-penalization for the source domain and the target domain based on the generated mixup sample.

In addition, the controller updates a bidirectional matching value based on a source domain weight, if the target domain weight is more than a threshold associated with the target domain.

In addition, the controller updates the bidirectional matching value based on the target domain weight, if the target domain weight is less than or equal to a threshold associated with the target domain, and if the source domain weight is more than a threshold associated with the source domain.

In addition, the controller obtains a consistency regularization loss for the mixup sample, and updates a consistency regularization loss for each of the source domain and the target domain by using the consistency regularization loss for the mixup sample.

In addition, the controller confirms the source domain weight and target domain weight values based on learning results through the unsupervised domain adaptation.

In addition, the sum of the first ratio and the second ratio is 1.

Advantageous Effects

As described above, by performing domain adaptation by generating an augmented domain for connecting a source domain and a target domain by using a mixup method having a fixed ratio, the method and apparatus for unsupervised domain adaptation according to the present invention have an effect of resolving a large domain mismatch.

In addition, by generating an augmented domain based on a source domain, and generating an augmented domain based on a target domain to gradually transfer learning results from the source domain to the target domain through bidirectional matching between the augmented domains, the method and apparatus for unsupervised domain adaptation according to the present invention have an effect of resolving a large domain mismatch.

MODES OF THE INVENTION

Figure 1:
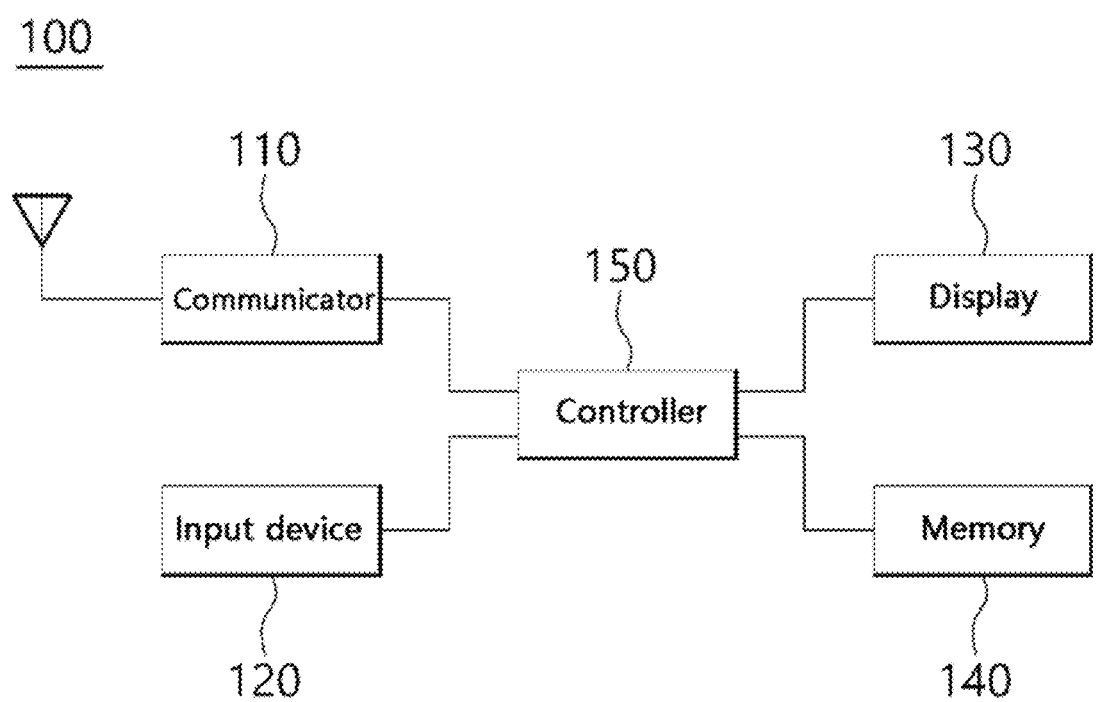
FIG. 1 is a diagram illustrating the apparatus for unsupervised domain adaptation according to an exemplary embodiment of the present invention.

Hereinafter, preferred exemplary embodiments according to the present invention will be described in detail with reference to the accompanying drawings. The detailed description set forth below in conjunction with the accompanying drawings is intended to describe the exemplary embodiments of the present invention and is not intended to represent the only exemplary embodiments in which the present invention may be practiced. In order to clearly describe the present invention in the drawings, parts that are not related to the description may be omitted, and the same reference numerals may be used for the same or similar components throughout the specification.

FIG. 1 is a diagram illustrating the apparatus for unsupervised domain adaptation according to an exemplary embodiment of the present invention.

Referring to FIG. 1, the apparatus for unsupervised domain adaptation 100 (hereinafter, referred to as an electronic apparatus 100) according to the present invention uses a neural network using a fixed ratio-based mixup, confidence-based learning and consistency regularization to perform domain adaptation. To this end, the electronic apparatus 100 includes a communicator 110, an input device 120, a display 130, a memory 140 and a controller 150.

The communicator 110 collects source data and target data from an external server through communication with an external server (not illustrated) or an external device (not illustrated), and provides the same to the controller 150. To this end, the communicator 110 performs wireless communication such as $5^{th}$ generation communication (5G), long term evolution-advanced (LTE-A), LTE, wireless fidelity (Wi-Fi) and the like.

The input device 120 generates input data in response to a user input of the electronic apparatus 100. To this end, the input device 120 may include an input means such as a keyboard, a keypad, a dome switch, a touch panel, a touch key, a mouse, a menu button and the like.

The display 130 displays display data according to the operation of the electronic apparatus 100. The display 130 may include a liquid crystal display (LCD), a light emitting diode (LED) display, an organic light emitting diode (OLED) display, a micro-electro mechanical systems (MEMS) display and an electronic paper display. The display 130 may be combined with the input device 120 to be implemented as a touch screen.

The memory 140 stores operation programs of the electronic apparatus 100. In particular, the memory 140 may store a neural network designed by using a fixed ratio-based mixup, confidence-based learning and consistency regularization. In addition, the memory 140 may store source data and target data.

The controller 150 selects a plurality of source data and a plurality of target data according to an input of the input device 120 from among the image data. In this case, the image data may be collected from an external server or an external device through the communicator 110, or may be image data acquired by a camera (not illustrated) provided in the electronic apparatus 100. The controller 150 sets a source domain including the selected source data and a target domain including the target data. In this case, the source data may be labeled image data, and the target data may be unlabeled image data.

The controller 150 generates a plurality of augmented domains having different and complementary characteristics between the source domain and the target domain in order to offset the occurrence of a large mismatch between the source domain and the target domain. However, in the present invention, for the convenience of description, the generation of a first augmented domain and a second augmented domain will be described as an example. The first augmented domain is a domain close to the source domain and has reliable label information, but has a low correlation with the target domain. The second augmented domain is a domain close to the target domain, and although label information is relatively inaccurate compared to the first augmented domain, it has a high similarity to the target domain.

The controller 150 uses a fixed ratio-based mixup to efficiently connect the source domain and the target domain by learning the first and second augmented domains.

The controller 150 gradually moves the second augmented domain to the target domain by introducing bidirectional matching using positive pseudo-labels based on high reliability prediction for the target data. In addition, the controller 150 applies self-penalization using negative pseudo-labels in order to improve performance through self-learning. To this end, the controller 150 uses confidence-based learning.

In order to prevent the divergence of data included in the first augmented domain and the second domain generated in the source domain and the target domain through consistency regularization, the controller 150 uses a domain having the same ratio of source data and target data.

More specifically, the controller 150 sets a first ratio that is a fixed mixup ratio for the source domain and sets a second ratio that is a fixed mixup ratio for the target domain. In this case, the mixup is set using Mathematical Formula 1 below, and the mixup refers to a method of combining two images with different weights.

$$\tilde{x}_i^{st} = \lambda x_i^s + (1-\lambda) x_i^t$$

$$\tilde{y}_i^{st} = \lambda y_i^s + (1-\lambda) \hat{y}_i^t \qquad \text{[Mathematical Formula 1]}$$

In this case, $\tilde{x}_i^{st}$ refers to a result of mixup for an image, $\tilde{y}_i^{st}$ refers to a result of mixup for a label, and $\lambda$ refers to a mixup ratio. When a pair of input data $((x_i^s, y_i^s), (x_i^t, \hat{y}_i^t))$ and a corresponding one-hot label are provided in the source domain and the target domain, the controller 150 may set a mixup by using Mathematical Formula 1. In this case, since the one-hot label is a label representing one object, it is a label representing an object included in the image data constituting the source domain and an object included in the image data constituting the target domain, respectively. In addition, $\hat{y}_i^t$ is a pseudo-label obtained from a baseline model for unlabeled target data.

In addition, it is preferable that the sum of the first ratio and the second ratio is 1. The controller 150 generates a first augmented domain and a second augmented domain by using a fixed mix-up ratio. In this case, the first augmented domain may be a mixup sample for the source domain, and the second augmented domain may be a mixup sample for the target domain.

Moreover, the controller 150 defines a fixed ratio-based mixup by using Mathematical Formula 2 below.

$$\mathcal{L}_{fm} = \frac{1}{B} \sum_{i=1}^{B} \hat{y}_i^{st} \log(p(y \mid \tilde{x}_i^{st})), \qquad \text{[Mathematical Formula 2]}$$

In this case, B refers to the mini-batch size, $\hat{y}_i^{st}$ refers to argmax $p(y|\tilde{x}_i^{st})$, and $p(y|\tilde{x}_i^{st})$ refers to a predicted class distribution generated from the model by the input $\tilde{x}_i^{st}$.

As described above, the first and second augmented domains generated through the fixed ratio-based mixup have different characteristics and are developed through complementary learning. In order to use the two augmented domains as a bridge for connecting the source domain to the target domain, the controller 150 provides confidence-based learning in which one augmented domain teaches another augmented domain by using a positive pseudo-label, or provides confidence-based learning in which a negative pseudo-label is used to self-teach.

For confidence-based learning in which one augmented domain teaches another augmented domain by using a positive pseudo-label, the controller 150 assumes that the prediction label is a pseudo-label when one augmented domain is input to a specific threshold or more. This pseudo-label may be a positive pseudo-label. In addition, the controller 150 trains a peer network such that the prediction through the standard cross-entropy loss matches the positive pseudo-label. In this case, since the present method derives results from two augmented domains for the same input, bidirectional matching may be used. In this case, the bidirectional matching is defined by Mathematical Formula 3 below.

$$\mathcal{L}_{bim} = \frac{1}{B} \sum_{i=1}^{B} \mathbb{1}\left(\max(p(y \mid x_i^t) > \tau) \hat{y}_i^t \log(q(y \mid x_i^t))\right) \qquad \text{[Mathematical Formula 3]}$$

In this case, p and q refer to the probability distributions of the two augmented domains, $\tau$ refers to a specific threshold, $\hat{y}_i^t$ refers to argmax $p(y|x_i^t)$, and the specific threshold refers to a reference value for determining whether to teach another augmented domain or perform a self-penalty.

For confidence-based learning that self-teaches using a negative pseudo-label, since the probability that the negative pseudo-label is not an accurate label is high, the controller 150 must increase the probability values for all classes except for the negative pseudo-label. Therefore, the output probability corresponding to the negative pseudo-label is optimized close to zero. To this end, the present method performs a self-penalty using a negative pseudo-label, and the self-penalty is defined by Mathematical Formula 4 below. In addition, the negative pseudo-label refers to a label with the highest reliability predicted in the domain with a reliability lower than the threshold. Moreover, the threshold is adaptively changed by the sample mean and standard deviation of a mini-batch.

$$\mathcal{L}_{sp} = \frac{1}{B} \sum_{i=1}^{B} \mathbb{1}\left(\max(p(y \mid x_i^t) < \tau) \hat{y}_i^t \log(1 - p(y \mid x_i^t))\right) \qquad \text{[Mathematical Formula 4]}$$

As described above, through confidence-based learning, the two augmented domains with different characteristics gradually approach the target domain because these are learned as reliable pseudo-labels in the target data. Since a well-trained model must be normalized to have consistent results in the same space, the controller 150 provides a new consistency regularization to ensure more stable convergence to the learning results of the two augmented domains by using Mathematical Formula 5 below. To this end, a fixed mixup ratio for the source domain may be set to 0.5, and a fixed mixup ratio for the target domain may be set to 0.5 for an intermediate space between the source domain and the target domain.

$$\mathcal{L}_{cr} = \frac{1}{B} \sum_{i=1}^{B} \| p(y \mid \tilde{x}_i^{st}) - q(y \mid \tilde{x}_i^{st}) \|_2^2 \qquad \text{[Mathematical Formula 5]}$$

Figure 2:
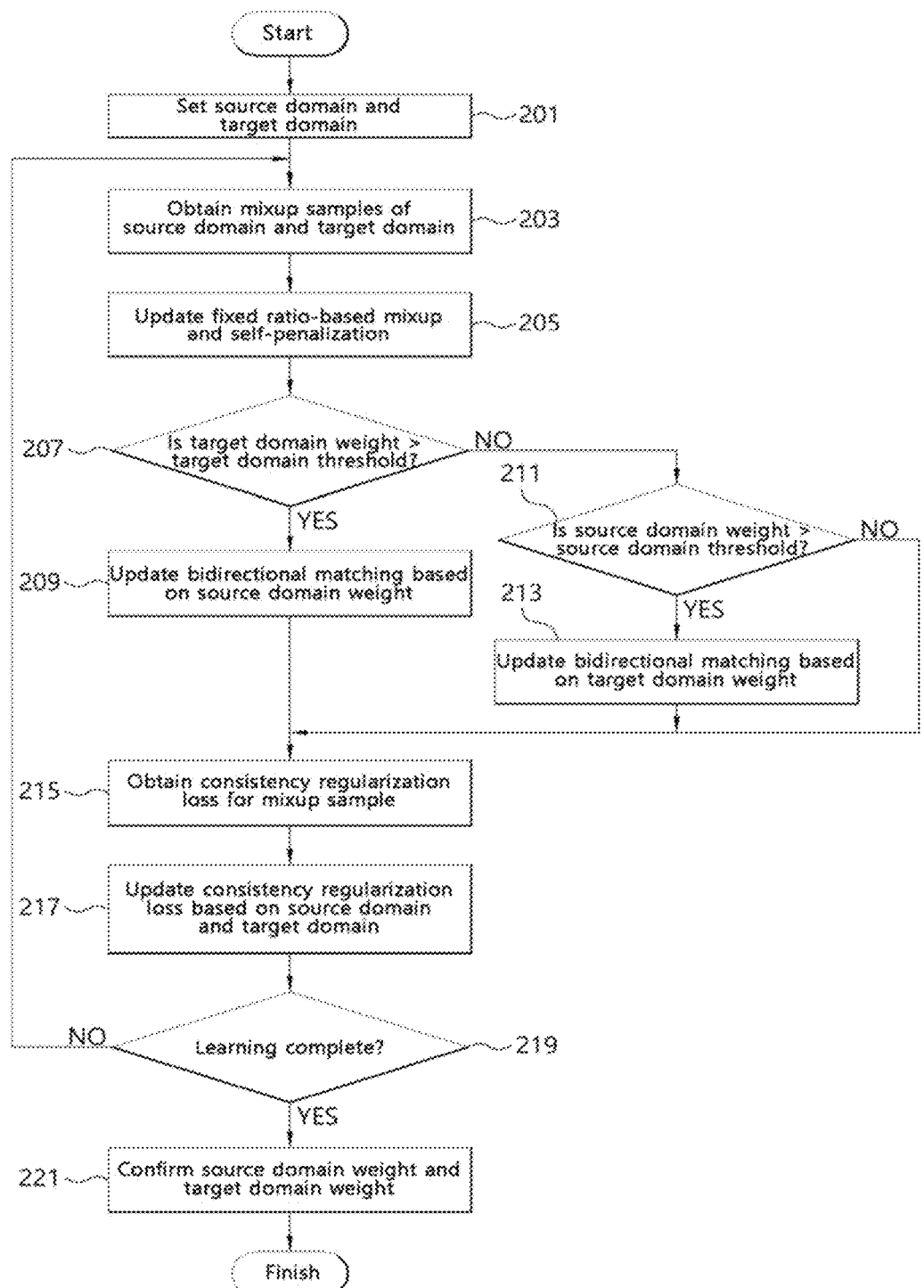
FIG. 2 is a flowchart for describing the method for unsupervised domain adaptation according to an exemplary embodiment of the present invention.
Figure 3:
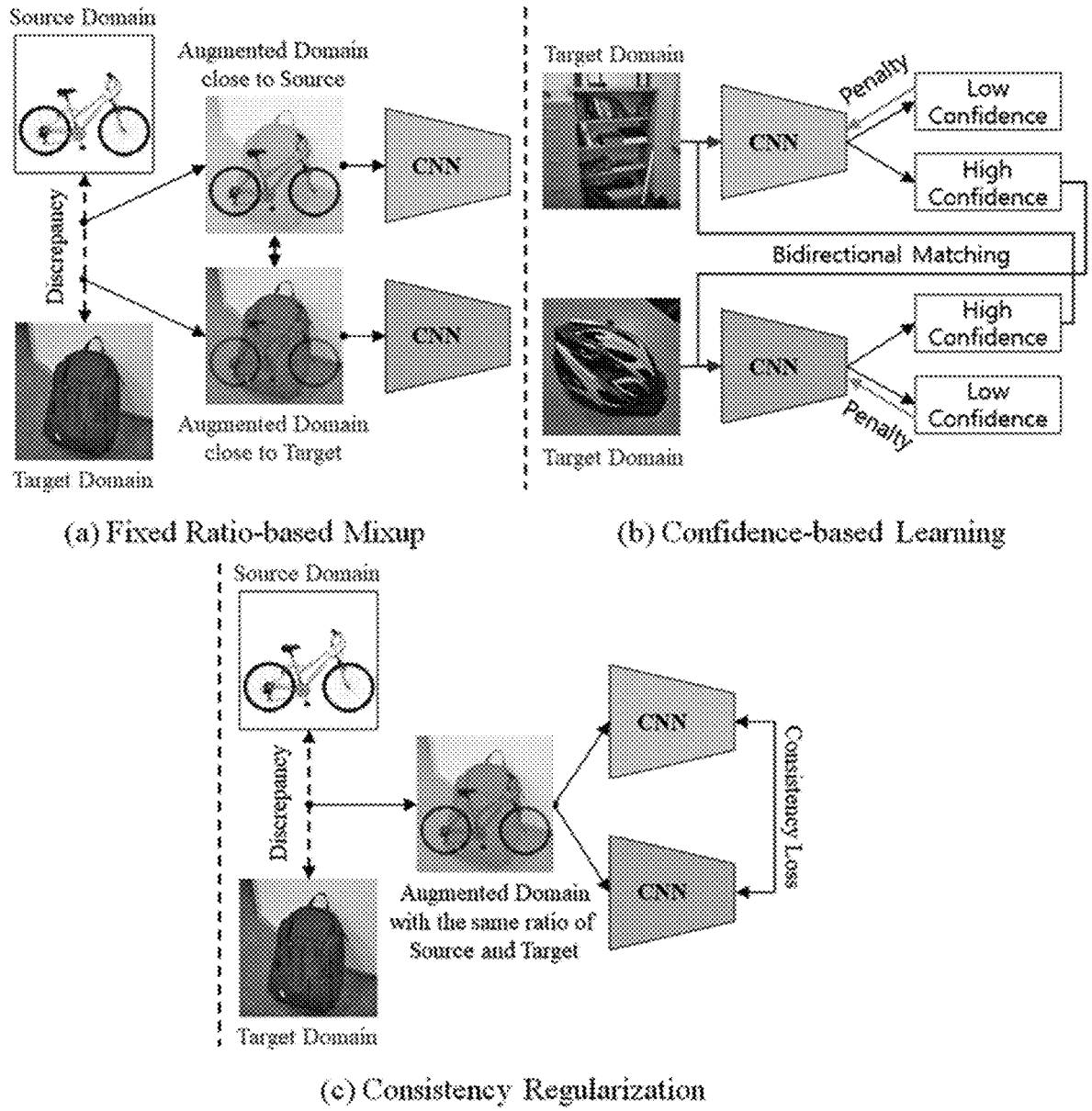
FIG. 3 is an exemplary screen diagram for describing the method of constructing a neural network designed for unsupervised domain adaptation according to an exemplary embodiment of the present invention.

FIG. 2 is a flowchart for describing the method for unsupervised domain adaptation according to an exemplary embodiment of the present invention. FIG. 3 is an exemplary screen diagram for describing the method of constructing a neural network designed for unsupervised domain adaptation according to an exemplary embodiment of the present invention.

Referring to FIGS. 2 and 3, in step 201, the controller 150 sets a source domain including source data and a target domain including target data for applying the unsupervised domain adaptation method. In this case, the source data may be labeled image data, and the target data may be unlabeled image data.

In step 203, the controller 150 generates a mixup sample for each of the source domain and the target domain as shown in (a) of FIG. 3 to generate a first augmented domain (augmented domain close to source) and a second augmented domain (augmented domain close to target). More specifically, the controller 150 may set a first ratio that is a fixed mixup ratio for the source domain to generate a mixup sample for the source domain that is the first augmented domain. The first augmented domain is a domain whose supervisory function is stronger than that of the target domain, and it is based on the source domain and has reliable label information for the source data.

Moreover, the controller 150 may set a second ratio that is a fixed mixup ratio for the target domain to generate a mixup sample for the target domain that is the second augmented domain. The second augmented domain is a domain in which a supervisory function for the target domain is stronger than a supervisory function for the source domain, and it is based on the target domain. In the second augmented domain, label information for the target data may be inaccurate or may not exist, but the similarity to the target domain is high. Moreover, the controller 150 may obtain a pseudo-label from a baseline model for unlabeled target data. In addition, it is preferable that the sum of the first ratio and the second ratio is 1.

In step 205, the controller 150 updates the fixed ratio-based mixup and self-penalization. More specifically, the controller 150 updates the fixed ratio-based mixup by using the mixup sample for the source domain and the weight for the source domain obtained in step 203, and updates self-penalization by using the weight for the source domain and the target data as shown in (b) of FIG. 3. In this case, although it is illustrated that there are two target domains in (b) of FIG. 3, this is to show an example of learning different target domains, and any one of the two target domains may be changed and applied as a source domain.

In addition, the controller 150 updates the fixed ratio-based mixup by using the mixup sample for the target domain and the weight for the target domain obtained in step 203, and updates self-penalization by using the weight for the target domain and target data as shown in (b) of FIG. 3. In this case, the weight for the source domain and the weight for the target data refer to pre-trained reference weights.

Next, the controller 150 starts learning by using bidirectional matching as shown in (b) of FIG. 3. To this end, in step 207, the controller 150 compares the weight of the target domain with a threshold associated with the target domain. In this case, the threshold associated with the target domain is a threshold close to the target domain, which may be a threshold for the second augmented domain. As a result of the comparison in step 207, if the weight of the target domain is more than the threshold associated with the target domain, the controller 150 performs step 209 because it is a properly made pseudo-label, and if the weight of the target domain is less than or equal to the threshold associated with the target domain, step 211 is performed. In step 209, the controller 150 updates the bidirectional matching value by teaching the first augmented domain using the weight of the source domain and the target data, and performs step 215.

Conversely, in step 211, the controller 150 compares the weight of the source domain with a threshold associated with the source domain. In this case, the threshold associated with the source domain is a threshold close to the source domain, which may be a threshold for the first augmented domain. As a result of the comparison in step 211, if the weight of the source domain is more than the threshold associated with the source domain, the controller 150 performs step 213 because it is a properly made pseudo-label, and if the weight of the source domain is less than or equal to the threshold associated with the source domain, step 215 is performed. In step 213, the controller 150 updates the bidirectional matching value by teaching the second augmented domain using the weight of the target domain and the target data, and performs step 215. In this case, one augmented domain is learned by using the pseudo-label of the peer network that satisfies the threshold condition. Moreover, steps 207 to 213 are repeatedly performed under the condition that the number of learning currently being learned is more than a warm-up epoch.

Next, the controller 150 applies a consistency regularization loss as shown in (c) of FIG. 3 to ensure stable convergence. To this end, in step 215, the controller 150 obtains a consistency regularization loss for the mixup sample by using the mixup ratio for consistency regularization. In this case, the mixup ratio for consistency regularization may be 0.5.

In step 217, the controller 150 updates a consistency regularization loss based on the obtained consistency regularization loss for the mixup sample and the weight of the source domain, and updates a consistency regularization loss based on the consistency regularization loss for the mixup sample and the weight of the target domain.

In step 219, when it is confirmed that learning by using unsupervised domain adaptation is completed, that is, if learning is completed by a preset total number of epochs, the controller 150 performs step 221, and if the completion of learning is not confirmed, it returns to step 203 to re-perform the above operations. In step 221, the controller 150 may confirm the weight of the source domain and the weight of the target domain based on the learning results.

The exemplary embodiments of the present invention disclosed in the present specification and drawings are only provided for presenting specific examples to easily describe the technical contents of the present invention and help the understanding of the present invention, and are not intended to limit the scope of the present invention. Accordingly, the scope of the present invention should be construed as including all changes or modifications that are derived based on the technical spirit of the present invention, in addition to the exemplary embodiments disclosed herein.

The invention claimed is:

1. A method for unsupervised domain adaptation, comprising the steps of:
    generating a first augmented domain associated with a source domain;
    generating a second augmented domain associated with a target domain; and
    performing unsupervised domain adaptation by using the first augmented domain and the second augmented domain as a bridge for connecting the source domain and the target domain,
    wherein the step of generating the first augmented domain is setting a first ratio that is a fixed mixup ratio for the source domain and generating a mixup sample for the source domain by using the first ratio.

2. The method of claim 1, wherein the step of generating the second augmented domain is setting a second ratio that is a fixed mixup ratio for the target domain and generating a mixup sample for the target domain by using the second ratio.

3. The method of claim 2, wherein the step of performing the unsupervised domain adaptation comprises:
    updating a fixed ratio-based mixup and self-penalization for the source domain and the target domain based on the generated mixup sample.

4. The method of claim 3, further comprising:
after updating the fixed ratio-based mixup and self-penalization,
updating a bidirectional matching value based on a source domain weight, if the target domain weight is more than a threshold associated with the target domain.

5. The method of claim 4, further comprising:
confirming whether the source domain weight is more than a threshold associated with the source domain, if the target domain weight is less than or equal to a threshold associated with the target domain; and
updating the bidirectional matching value based on the target domain weight, if the source domain weight is more than a threshold associated with the source domain.

6. The method of claim 5, further comprising:
after updating the bidirectional matching value,
obtaining a consistency regularization loss for the mixup sample; and
updating a consistency regularization loss for each of the source domain and the target domain by using the consistency regularization loss for the mixup sample.

7. The method of claim 6, further comprising:
after performing the unsupervised domain adaptation,
confirming the source domain weight and target domain weight values based on learning results through the unsupervised domain adaptation.

8. The method of claim 2, wherein the sum of the first ratio and the second ratio is 1.

9. An apparatus for unsupervised domain adaptation, comprising:
a memory for storing a plurality of image data; and
a controller for performing unsupervised domain adaptation by generating a first augmented domain associated with a source domain including source data that is a plurality of image data among the image data and a second augmented domain associated with a target domain including target data that is a plurality of image data among the image data, and using the first augmented domain and the second augmented domain as a bridge for connecting the source domain and the target domain,
wherein the first augmented domain is a mixup sample for the source domain generated by setting a first ratio that is a fixed mixup ratio for the source domain and using the first ratio.

10. The apparatus of claim 9, wherein the second augmented domain is a mixup sample for the target domain generated by setting a second ratio that is a fixed mixup ratio for the target domain and using the second ratio.

11. The apparatus of claim 10, wherein the controller updates a fixed ratio-based mixup and self-penalization for the source domain and the target domain based on the generated mixup sample.

12. The apparatus of claim 11, wherein the controller updates a bidirectional matching value based on a source domain weight, if the target domain weight is more than a threshold associated with the target domain.

13. The apparatus of claim 12, wherein the controller updates the bidirectional matching value based on the target domain weight, if the target domain weight is less than or equal to a threshold associated with the target domain, and if the source domain weight is more than a threshold associated with the source domain.

14. The apparatus of claim 13, wherein the controller obtains a consistency regularization loss for the mixup sample, and updates a consistency regularization loss for each of the source domain and the target domain by using the consistency regularization loss for the mixup sample.

15. The apparatus of claim 14, wherein the controller confirms the source domain weight and target domain weight values based on learning results through the unsupervised domain adaptation.

16. The apparatus of claim 10, wherein the sum of the first ratio and the second ratio is 1.

* * * * *